US009685767B2

(12) United States Patent
Firstenberg et al.

(10) Patent No.: US 9,685,767 B2
(45) Date of Patent: *Jun. 20, 2017

(54) CORONA IGNITION DEVICE WITH IMPROVED SEAL

(71) Applicant: Federal-Mogul Ignition Company, Southfield, MI (US)

(72) Inventors: Keith Firstenberg, Livonia, MI (US); William J. Walker, Jr., Ann Arbor, MI (US); Patrick J. Durham, Troy, MI (US); James D. Lykowski, Temperance, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/225,341

(22) Filed: Aug. 1, 2016

(65) Prior Publication Data

US 2016/0344165 A1 Nov. 24, 2016

Related U.S. Application Data

(63) Continuation-in-part of application No. 14/822,073, filed on Aug. 10, 2015.

(60) Provisional application No. 62/035,452, filed on Aug. 10, 2014.

(51) Int. Cl.

| | |
|---|---|
| ***H01T 13/20*** | (2006.01) |
| ***H01T 19/00*** | (2006.01) |
| ***C03C 3/066*** | (2006.01) |
| ***C03C 8/24*** | (2006.01) |
| ***C03C 8/18*** | (2006.01) |
| ***H01B 1/16*** | (2006.01) |
| ***H01T 13/34*** | (2006.01) |
| ***H01T 21/02*** | (2006.01) |

(Continued)

(52) U.S. Cl.

CPC .............. *H01T 19/00* (2013.01); *C03C 3/066* (2013.01); *C03C 8/18* (2013.01); *C03C 8/24* (2013.01); *H01B 1/16* (2013.01); *H01T 13/34* (2013.01); *H01T 13/50* (2013.01); *H01T 21/02* (2013.01); *C03C 2204/00* (2013.01); *H01T 21/00* (2013.01)

(58) Field of Classification Search

CPC .. H01T 19/00; C03C 8/24; C03C 4/14; C03C 2204/00

USPC .......................................................... 313/141

See application file for complete search history.

(56) References Cited

U.S. PATENT DOCUMENTS 9,407,069 B2 * 8/2016 Firstenberg ............. H01T 13/08
2016/0039712 A1 * 2/2016 Firstenberg ............... C03C 8/18
313/141

* cited by examiner

*Primary Examiner* — Vip Patel
(74) *Attorney, Agent, or Firm* — Robert L. Stearns; Dickinson Wright, PLLC

(57) ABSTRACT

An electrically conductive glass seal for providing a hermetic bond between an electrically conductive component and an insulator of a corona igniter is provided. The glass seal is formed by mixing glass frits, binder, expansion agent, and electrically conductive metal particles. The glass frits can include silica ($SiO_2$), boron oxide ($B_2O_3$), aluminum oxide ($Al_2O_3$), bismuth oxide ($Bi_2O_3$), and zinc oxide (ZnO); the binder can include sodium bentonite or magnesium aluminum silicate, polyethylene glycol (PEG), and dextrin; the expansion agent can include lithium carbonate; and the electrically conductive particles can include copper. The finished glass seal includes the glass in a total amount of 50.0 to 90.0 weight (wt. %), and electrically conductive metal particles in an amount of 10.0 to 50.0 wt. %, based on the total weight of the glass seal.

27 Claims, 2 Drawing Sheets

(51) Int. Cl.

| | |
|---|---|
| ***H01T 13/50*** | (2006.01) |
| *H01T 21/00* | (2006.01) |

CORONA IGNITION DEVICE WITH IMPROVED SEAL

CROSS REFERENCE TO RELATED APPLICATIONS

This U.S. Continuation-In-Part application claims the benefit of U.S. patent application Ser. No. 14/822,073, filed Aug. 10, 2015, which claims the benefit of U.S. provisional patent application Ser. No. 62/035,452, filed Aug. 10, 2014, the entire contents of which are incorporated herein by reference.

BACKGROUND OF THE INVENTION

1. Field of the Invention

This invention relates generally to glass seals for ignition devices, and more particular to corona igniters including glass seals, and methods of forming the same.

2. Related Art

Glass seals are oftentimes used to form a hermetic bond between an electrically conductive component, such as central electrode, and an insulator of an ignition device, for example a corona igniter. The glass seal of the corona igniter is typically formed by disposing a glass powder in a bore of the insulator, and then subsequently firing the insulator, central electrode, and glass powder together in a furnace. The heat also causes certain components of the glass seal to expand and thus form the hermetic bond between the insulator and central electrode. However, as the glass powder between the central electrode and insulator melts and expands, gas bubbles or gas pores are formed, and those bubbles or pores remain in the glass seal of the finished corona igniter, even after the glass seal cools to room temperature. Thus, when the corona igniter is used in an internal combustion engine and subjected to a high electric field, the electric field causes the gas contained in the bubbles or pores to become ionized and form corona. The ionized gas generates a cascade of ionized charges which transmits heat to the surrounding solid insulator. A thermal breakdown mechanism occurs, which can create a dielectric breakdown. The effect of this dielectric breakdown caused by the gas is especially pronounced when the bubbles or pores are large, in which case dielectric failure of the insulator can occur. Dielectric punctures through the insulator to the expanded glass seal could potentially result in failure of the corona igniter.

SUMMARY OF THE INVENTION

One aspect of the invention provides an electrically conductive glass seal having an electrical conductivity ranging from $9\times10^6$ S/m to $65\times10^6$ S/m for providing a hermetic bond between an electrically conductive component and an insulator of a corona igniter. The glass seal includes at least one glass in a total amount of 50.0 to 90.0 weight percent (wt. %), and electrically conductive metal particles in an amount of 10.0 to 50.0 wt. %, based on the total weight of the glass seal. The glass seal also includes gas-filled pores in an amount of 25.0 to 75.0 volume percent (vol. %), based on the total volume of the glass seal.

Another aspect of the invention provides a corona igniter including an insulator surrounding an electrically conductive component, and an electrically conductive glass seal providing a hermetic bond between the electrically conductive component and the insulator. The electrically conductive glass seal includes at least one glass in a total amount of 50.0 to 90.0 wt. %, and electrically conductive metal particles in an amount of 10.0 to 50.0 wt. %, based on the total weight of the glass seal. The glass seal has an electrical conductivity ranging from $9\times10^6$ S/m to $65\times10^6$ S/m. The glass seal also includes gas-filled pores in an amount of 25.0 to 75.0 vol. %, based on the total volume of the glass seal.

Yet another aspect of the invention provides a method of manufacturing a glass seal for a corona igniter. The method includes providing a mixture including at least one glass frit in a total amount of 48.8 to 90.0 wt. %, a binder in an amount of 0.1 to 3.0 wt. %, an expansion agent in an amount of 0.1 to 1.0 wt. %, and electrically conductive metal particles in an amount of 14.8 to 50.0 wt. %, based on the total weight of the mixture. The method further includes firing the mixture to form the glass seal, wherein the glass seal has an electrical conductivity ranging from $9\times10^6$ S/m to $65\times10^6$ S/m.

Another aspect of the invention provides a method of manufacturing a corona igniter including an electrically conductive glass seal providing a hermetic bond between an electrically conductive component and an insulator. The method includes disposing a mixture between the electrically conductive component and the insulator, wherein the mixture comprises at least one glass frit in a total amount of 48.8 to 90.0 wt. %, a binder in an amount of 0.1 to 3.0 wt. %, an expansion agent in an amount of 0.1 to 1.0 wt. %, and electrically conductive metal particles in an amount of 14.8 to 50.0 wt. %, based on the total weight of the mixture. The method further includes firing the mixture to form the glass seal, wherein the glass seal has an electrical conductivity ranging from $9\times10^6$ S/m to $65\times10^6$ S/m.

The electrically conductive particles surround any gas filled pores which are formed during firing of the glass seal. The electrically conductive particles eliminate the electric field across the pores when the corona igniter is used in an internal combustion engine and subjected to a high electric field. Thus, ionization of the gas which could initiate dielectric breakdown and dielectric puncture through the insulator of the corona igniter is eliminated.

BRIEF DESCRIPTION OF THE DRAWINGS

Other advantages of the present invention will be readily appreciated, as the same becomes better understood by reference to the following detailed description when considered in connection with the accompanying drawings wherein.

DESCRIPTION OF THE ENABLING EMBODIMENT

Figure 1:
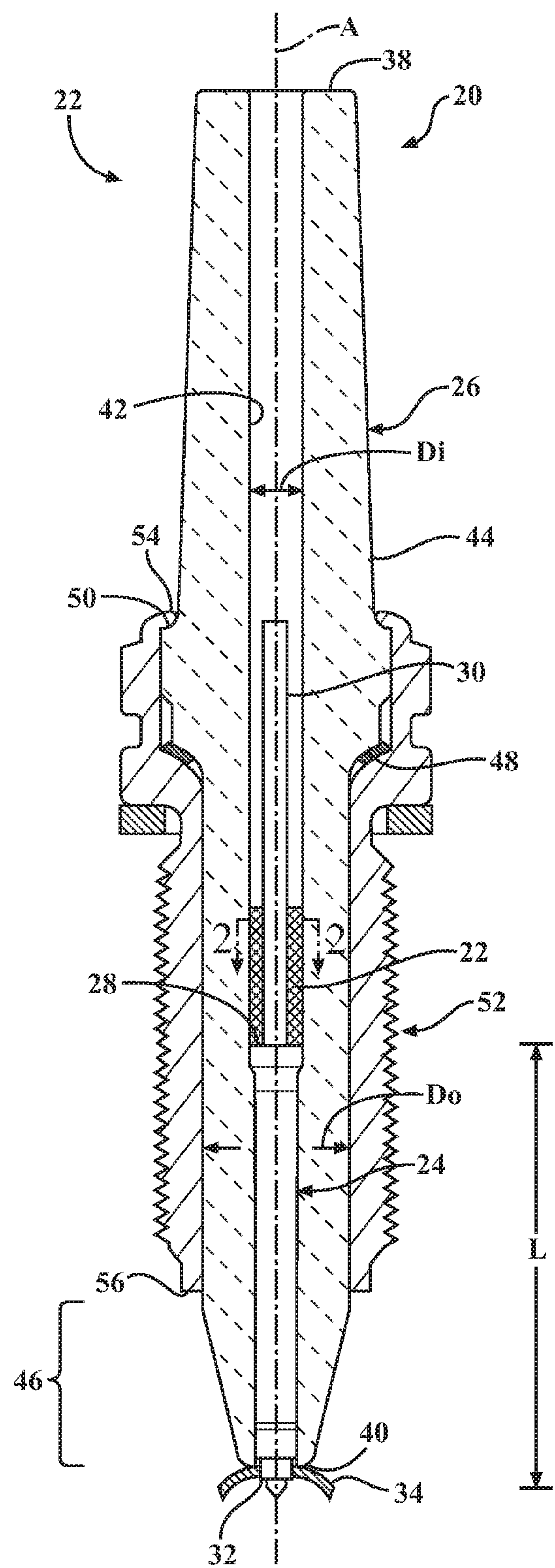
FIG. 1 is a cross-sectional view of a corona igniter including an electrically conductive glass seal according to an exemplary embodiment of the invention.

One aspect of the invention provides a corona igniter 20 including an electrically conductive glass seal 22 providing a hermetic bond between at least one electrically conductive component, such as a central electrode 24, and an insulator 26, as shown in FIG. 1. The composition of the glass seal 22 reduces the potential for dielectric breakdown and thus dielectric punctures through the insulator 26 when the central electrode 24 or other electrically conductive components of the corona igniter 20 receives a high radio frequency electric field during use in an internal combustion engine.

The electrically conductive glass seal 22 is formed from a powder mixture which includes a mixture of electrically conductive particles, at least one binder, an expansion agent, and glass frits. In an exemplary embodiment, the glass seal 22 includes the electrically conductive particles in an amount of 10.0 to 50.0 weight percent (wt. %), and preferably 20.0 wt. %, based on the total weight of the glass seal 22. The powder used to form the glass seal 22 typically includes the electrically conductive particles in an amount of 14.8 to 50.0 wt. %, based on the total weight of the powder used to form the glass seal 22.

The electrically conductive particles can include a single material or a mixture of different materials. Any conductive metal can be used to form the electrically conductive particles, but in the exemplary embodiment, the electrically conductive particles consist of, or essentially of, copper. Also, the electrically conductive particles can comprise various forms, but in the exemplary embodiment, they are provided in the form of copper flakes having a particle size of less than 325 mesh, or 45 microns. The electrically conductive particles cause the glass seal 22 to be electrically conductive. In one exemplary embodiment, the glass seal 22 has an electrical conductivity ranging from $9\times10^6$ S/m to $65\times10^6$ S/m, or above $9\times10^6$ S/m, and preferably above $30\times10^6$ S/m.

As described above, in comparative corona igniters including non-conductive glass seals, the gas bubbles or pores become ionized and form corona during service, which can lead to dielectric failure of the insulator. However, when the electrically conductive glass seal 22 of the present invention is used in the corona igniter 20, the electrically conductive particles surround the gas bubbles or pores and thus eliminate the electric field across the bubbles or pores when the high radio frequency voltage is applied to the corona igniter 20. Since no corona discharge is formed along the bubbles or pores of the electrically conductive glass seal 22, the initiation mechanism for ionization breakdown and dielectric puncture through the insulator 26 is eliminated.

The powder used to form the electrically conductive glass seal 22 also includes the at least one binder in an amount up to 3.0 wt. %, based on the total weight of the powder used to form the glass seal 22. The binders help adhere the components of the glass seal 22 together when the glass seal 22 is introduced into the bore of the insulator 26. Preferably, the glass seal 22 includes a mixture of inorganic binder and synthetic or natural organic binders. When the powder used to form the glass seal 22 is heated to a glass melting temperature during the firing step, at least a portion of the binder, typically the organic binder, burns off and thus is not present in the composition of the fired glass seal 22.

In the exemplary embodiment, the powder used to form the glass seal 22 includes the inorganic binder in an amount up to 2.0 wt. %, or 0.1 to 2.0 wt. %, and preferably 1.0 wt. %, based on the total weight of the powder used to form the glass seal 22. The inorganic binder can include a single material or a mixture of different materials. Any type of inorganic binder material can be used in the glass seal 22, but typically the inorganic binder includes natural or engineered clay. In the exemplary embodiment, the inorganic binder consists of, or consists essentially of, sodium bentonite or magnesium aluminum silicate, which is sold under the name Veegum®.

The powder used to form the glass seal 22 of the exemplary embodiment also includes the synthetic or natural organic binder in an amount up to 2.0 wt. %, or 0.1 to 2.0 wt. %, and preferably 0.65 wt. %, based on the total weight of the powder used to form the glass seal 22. The synthetic or natural organic binder can include a single material or a mixture of different materials. Any type of synthetic or natural organic binder material can be used in the glass seal 22. However, in the exemplary embodiment, the synthetic or natural organic binder consists of, or consists essentially of, polyethylene glycol (PEG) and maltodextrin or dextrin. In this embodiment, the PEG is present in an amount of 0.15 wt. %, and the maltodextrin or dextrin is present in an amount of 0.5 wt. %, based on the total weight of the powder used to form the glass seal 22.

The powder used to form the electrically conductive glass seal 22 also includes the expansion agent in an amount up to 1.0 wt. %, or 0.1 to 1.0 wt. %, and preferably 0.5 wt. %, based on the total weight of the powder used to form the glass seal 22. The expansion agent can include a single material or a mixture of different materials. Any type of expansion agent can be used in the glass seal 22, but in the exemplary embodiment, the expansion agent consists of, or consists essentially of lithium carbonate. At least a portion of the expansion agent converts from a solid to a gas when heated to the glass melting temperature during the firing step, thus causing the glass seal 22 to expand.

The balance of the electrically conductive glass seal 22 is typically formed of glass. The power used to from the glass seal 22 includes a plurality of glass frits, which is finely powdered glass. The glass frits are present in an amount that causes the fired glass seal to include glass in an amount of 50.0 to 90.0 wt. %, or 50.0 to 86.0 wt. %, and preferably 80.0 wt. %, based on the total weight of the glass seal 22. In the exemplary embodiment, the glass frits are present in an amount of 48.8 to 90.0 wt. %, or 50.0 to 84.8 wt. %, or 50.0 to 86.0 wt. %, and preferably 80.0 wt. %, based on the total weight of the powder used to form the glass seal 22. In one embodiment, the amount of glass frits used to form the glass seal 22 is selected so that the ratio between the glass frits and the electrically conductive particles is about 4 to 1.

The glass frits comprise ground glass and may contain multiple chemical elements chemically combined and fused into a single material. Any type of glass frits known in the art can be used. The glass seal may be formulated with a single glass frit, or multiple glass frits with different chemical compositions and different properties may be blended together. In the exemplary embodiment, multiple glass frits are used. The overall composition of the glass frits includes silica ($SiO_2$) in an amount of 35 to 40 wt. %, and preferably 38.6 wt. %, based on the total weight of the glass frits. The glass frits also include boron oxide ($B_2O_3$) in an amount of 20 to 28 wt. %, and preferably 26.9 wt. %; aluminum oxide ($Al_2O_3$) in an amount of 10 to 15 wt. %, and preferably 11.7 wt. %; bismuth oxide ($Bi_2O_3$) in an amount of 10.0 to 15.0 wt. %, preferably 6.0 to 8.0 wt. %, and more preferably 7.3 wt. %; and zinc oxide (ZnO) in an amount of 3.0 to 5.0 wt. %, and preferably 4.8 wt. %, based on the total weight of the glass frits. The glass frits further include alkali metal oxides, such as oxides of lithium (Li), sodium (Na), and potassium (K), in a total amount of 2.0 to 6.0 wt. %, based on the total weight of the glass frits. In the exemplary embodiment, the glass frits include the alkali metal oxides in a total amount of 4.7 wt. %, wherein 1.5 wt. % is lithium oxide and 3.1 wt. % is sodium oxide, based on the total weight of the glass frits. The glass frits also include alkaline earth metal oxides, such as oxides of magnesium (Mg), calcium (Ca), strontium (Sr), and barium (Ba) in a total amount of 3.0 to 7.0 wt. %, based on the total weight of the glass frits. In the exemplary embodiment, the glass frits include the alkaline earth metal oxides in a total amount of 5.9 wt. %, wherein at least 2.95 wt. % is strontium oxide and about 1.9 wt. % is magnesium oxide. However, it is noted that other amounts of alkali metal oxides and alkaline earth metal oxides could be used. The glass frits and the powder used to form the overall glass seal 22 can also include small amounts of other components and/or impurities.

Table 1 provides three example powder compositions used to form the glass seal 22 according to the present invention, in weight percent (wt. %), based on the total weight of the powder used to form the glass seal 22.

TABLE 1

| Component | Example A | Example B | Example C |
|---|---|---|---|
| Glass Frits | 77.85 | 81.65 | 85.45 |
| Copper Flakes | 20 | 16 | 12 |
| Sodium Bentonite | 1 | 1.2 | 1.4 |
| Lithium Carbonate | 0.5 | 0.5 | 0.5 |
| Polyethylene Glycol | 0.15 | 0.15 | 0.15 |
| Dextrin | 0.5 | 0.5 | 0.5 |

Table 2 provides exemplary glass frit compositions according to the present invention, in weight percent (wt. %), based on the total weight of the glass frit composition.

TABLE 2

| Component | Overall Range | Example Range 1 | Example 1 | Example Range 2 | Example 2 |
|---|---|---|---|---|---|
| Silicon Dioxide | 22-40 | 35-40 | 38.6 | 22-28 | 25.1 |
| Boron Oxide | 20-28 | 20-28 | 26.9 | 21-27 | 24.2 |
| Alumina | 10-22 | 10-15 | 11.7 | 16-22 | 18.4 |
| Bismuth Oxide | 5-15 | 5-10 | 7.3 | 10-15 | 12.5 |
| Zinc Oxide | 3-10 | 3-5 | 4.8 | 5-10 | 8.1 |
| Alkali Metal Oxides | 2-6 | 2-6 | 4.7 | 2-5 | 2.8 |
| Alkaline Earth Metal Oxides | 3-12 | 3-7 | 5.9 | 6-12 | 9.0 |

In the exemplary compositions of Table 2, the alkali metal oxides include one or more of the group comprising lithium oxide, sodium oxide and potassium oxide. In one example, approximately one third of the alkali metal oxides is lithium oxide and approximately two thirds is sodium oxide. However, any ratio of alkali metal oxides may be used. The alkaline earth metal oxides of the exemplary composition include one or more of the group comprising magnesium oxide, calcium oxide, strontium oxide and barium oxide. In one example more than one half of the alkaline earth metal oxides is strontium oxide and approximately one third is magnesium oxide. However, any ratio of alkaline earth metal oxides may be used. However, those of ordinary skill in the art understand that other types of alkali metals and alkaline earth metals can be used in addition to, or in place of those listed.

According to another example embodiment, the glass seal 22 is formed from a mixture of glass frits, electrically conductive particles, expansion agent, and inorganic binder, but no organic binder. According to this example embodiment, the glass frits are present in an amount that causes the fired glass seal 22 to include glass in an amount of 72.0 to 90.0 wt. %, based on the total weight of the glass seal 22. The powder used to form the glass seal 22 typically includes the glass frits in an amount of 72.0 to 90.0 wt. %, the electrically conductive particles in an amount of 10.0 to 25.0 wt. %, the inorganic binder in an amount of 1.0 to 5.0 wt. %, and the expansion agent in an amount of 0.10 to 0.50 wt. %, based on the total weight of the powder used to from the glass seal 22. Preferably, the electrically conductive particles are copper flakes, the inorganic binder is bentonite, and the expansion agent is calcium carbonate.

Table 3 provides an example powder composition used to form the glass seal 22 according to the alternate embodiment, in weight percent (wt. %), based on the total weight of the powder used to form the glass seal 22.

TABLE 3

| Component | Amount |
|---|---|
| Glass Frits | 76.5 |
| Copper Flakes | 20.0 |
| Bentonite | 3.0 |
| Calcium Carbonate | 0.5 |

Table 4 provides other exemplary glass frit compositions which are preferably used in the powder composition of Table 3, in weight percent (wt. %), based on the total weight of the glass frit composition. The other oxides listed in Table 4 can include any type of oxide.

TABLE 4

| Component | Overall Range | Example Amount |
|---|---|---|
| Silicon Dioxide | 60-70 | 64.6 |
| Boron Oxide | 17-25 | 22.2 |
| Aluminum Oxide | 4-10 | 5.2 |
| Alkali Metal Oxides | 3-10 | 7.7 |
| Alkaline Earth Metal Oxides | 0-5 | 0.3 |

In the exemplary compositions of Table 4, the alkali metal oxides include one or more of the group comprising lithium oxide, sodium oxide and potassium oxide. The alkaline earth metal oxides of the exemplary composition include one or more of the group comprising magnesium oxide, calcium oxide, strontium oxide and barium oxide. In one example embodiment, the glass frits includes sodium oxide ($Na_2O$) in an amount of 3.3 to 4.3 wt. %, potassium oxide ($K_2O$) in an amount of 3.4 to 4.4 wt. %, a combination of magnesium oxide and calcium oxide (MgO+CaO) in an amount of 0.2 to 0.4 wt. %, and other oxides in a total amount of 0.0 to 0.1 wt. %, based on the total weight of the glass frits. However, those of ordinary skill in the art understand that other amounts and other types of alkali metal oxides and alkaline earth metal oxides can be used in addition to, or in place of those listed.

The electrically conductive powder used to form the electrically conductive glass seal 22 can be prepared using various different methods, including any method known in the art. Typically, the method includes obtaining the electrically conductive particles, binder, expansion agent, and glass fits, and mixing those components together. Once the components are mixed together, the electrically conductive material can be disposed in a bore of the insulator 26.

In one embodiment, prior to disposing the electrically conductive material in the insulator 26, the materials are mixed together by dry mixing. Alternatively, the materials could be wet ground or mixed with water to form a slurry, and then spray dried to form a plurality of granulated particles or powder. The spray drying step includes disposing the slurry in a heated spray drier, wherein the slurry forms droplets with water that flashes off in the heated spray dryer, leaving small spherical granular particles. However, other methods can be used to provide the electrically conductive material in particulate or powder form. For example the dry powders can be dry mixed in a mixer or blender with a small amount of water subsequently added which causes the powder mixture to agglomerate into granular particles, which may be subsequently dried or partially dried. The granules or powder are relatively easy to handle, create little dust, and can be easily tamped or otherwise disposed in the bore of the insulator 26 around the central electrode 24, and around other electrically conductive components, if desired.

Once the electrically conductive material, typically the powder, is disposed in the bore of the insulator 26, the insulator 26, central electrode 24 and electrically conductive material are fired together in a furnace, according to any method known in the art. During the firing step, the components of the electrically conductive powder melt and expand to fill at least a portion of the bore of the insulator 26 around the central electrode 24, and thus form the electrically conductive glass seal 22 providing the hermetic bond between the central electrode 24 and the insulator 26. The firing temperature varies depending on the composition of the electrically conductive material, and in particular the composition of the glass frits, but typically ranges from 600 to 1000° C. For example, when the glass frits comprise the first example composition of Table 2, the firing temperature ranges from 750 to 800° C., and when the glass frits comprise the second example composition of Table 2, the firing temperature ranges from 650 to 700° C. In each case, the firing temperature is higher than the maximum temperature of the glass seal 22 during operation of the corona igniter 20.

Furthermore, at least a portion of the expansion agent converts from a solid to a gas and generates bubbles in the material during the firing step, which causes the material to expand. The increase in volume of the material and the volume of the bore occupied by the electrically conductive glass seal 22 can vary. The gas-filled bubbles lead to gas-filled pores remaining in the electrically conductive glass seal 22 after the firing step and when the glass seal 22 cools to room temperature. The gas-filled pores also remain in the glass seal 22 when the corona igniter 20 is used in the internal combustion engine. Typically, the fired glass seal 22 includes a plurality of gas-filled pores in an amount of 25.0 to 75.0 vol. %, and preferably 35.0 to 45.0 vol. %, based on the total volume of the glass seal. The electrically conductive particles prevent the potential for failure that could be caused by the gas-filled pores. Other than the change in mass of the expansion agent and the burnt off binder, the composition does not substantially change during the firing step, and the fired glass seal 22 has substantially the same composition as the starting powder.

Figure 2:
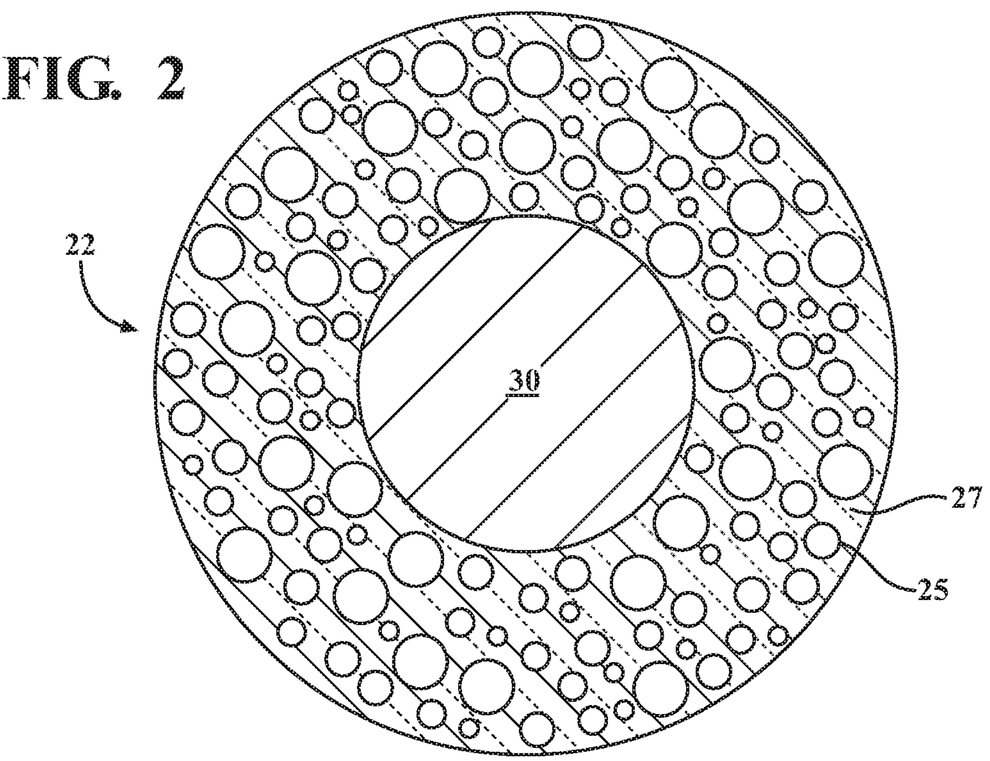
FIG. 2 is an illustration of the electrically conductive glass seal of FIG. 1 along line A-A after a firing step, which includes glass, conductive metal particles, and gas-filled pores.
Figure 2A:
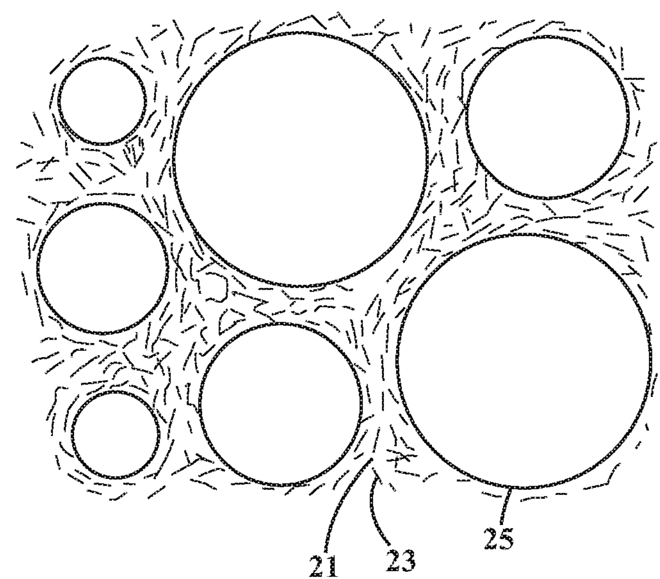
FIG. 2A is an enlarged view of a portion of FIG. 2.

FIGS. 2 and 2A illustrate the electrically conductive glass seal 22 of FIG. 1, which includes the glass 21, electrically conductive metal particles 23, and gas-filled pores 25 after the firing step. The pores 25 have an approximately spherical shape and are spaced from one another by a matrix 27 comprising the metal particles 23 distributed in the glass 21. The metal particles 23 are distributed with sufficient electrical contact between them such that the glass seal 22 is electrically conductive. Although the pores 25 are close to one another, they are isolated from one another so that there is no transport of gas between them, and thus no transport of gas through the glass seal 22.

As shown in FIG. 1, the electrically conductive glass seal 22 typically surrounds a terminal end 28 of the central electrode 24 and also surrounds a portion of a terminal 30. However, although not shown, the glass seal 22 could also surround other electrically conductive components disposed in the bore of the insulator 26, such as a resistor or a spring.

The corona igniter 20 including the electrically conductive glass seal 22 of the present invention can have various different designs, including, but not limited to the design shown in FIG. 1. In the exemplary embodiment of FIG. 1, the central electrode 24 is disposed in the bore of the insulator 26 beneath the terminal 30, and the terminal 30 engages the terminal end 28 of the central electrode 24. The central electrode 24 is formed of an electrically conductive material, such as nickel or a nickel alloy. The central electrode 24 has a length L extending along a center axis A from a terminal end 28 to a firing end 32, wherein a majority of the length L of the central electrode 24 is surrounded by the insulator 26. The terminal end 28 of the central electrode 24 is supported and maintained in a predetermined axial position by a reduced diameter of the insulator 26. Also in the exemplary embodiment, the central electrode 24 includes a firing tip 34 at the firing end 32. The firing tip 34 has a plurality of branches each extending radially outwardly from the center axis A for emitting an electric field and providing the corona discharge during use of the corona igniter 20 in the internal combustion engine.

The insulator 26 of FIG. 1 extends longitudinally along the center axis A from an insulator upper end 38 to an insulator nose end 40. The insulator 26 is formed of an insulating material, typically a ceramic such as such as alumina. The insulator 26 also presents an insulator inner surface 42 surrounding the bore which extends longitudinally from the insulator upper end 38 to the insulator nose end 40 for receiving the central electrode 24, terminal 30, and possibly other electrically conductive components. The firing tip 34 of the central electrode 24 is disposed longitudinally past the insulator nose end 40. The insulator inner surface 42 presents an insulator inner diameter Di extending across and perpendicular to the center axis A. The insulator inner diameter Di typically decreases along a portion of the insulator 26 moving toward the insulator nose end 40 for supporting a portion of the central electrode 24 and maintaining the central electrode 24 in the predetermined axial position.

The insulator 26 of the exemplary embodiment also presents an insulator outer surface 44 having an insulator outer diameter Do extending across and perpendicular to the center axis A. The insulator outer surface 44 extends longitudinally from the insulator upper end 38 to the insulator nose end 40. In the exemplary embodiment, the insulator outer diameter Do decreases along a portion of the insulator 26 adjacent the insulator nose end 40, moving toward the insulator nose end 40, to present an insulator nose region 46. The insulator outer diameter Do also decreases in a direction moving toward the insulator nose end 40 in a location spaced from the insulator nose region 46, approximately at the middle of the insulator 26, to present an insulator lower shoulder 48. The insulator outer diameter Do also decreases along a portion of the insulator 26 moving toward the insulator upper end 38 at a location spaced from the insulator lower shoulder 48 to present an insulator upper shoulder 50.

The corona igniter 20 also typically includes a shell 52 formed of metal and surrounding a portion of the insulator 26. The shell 52 is typically used to couple the insulator 26 to a cylinder block (not shown) of the internal combustion engine. The shell 52 extends along the center axis A from a shell upper end 54 to a shell lower end 56. The shell upper end 54 is disposed between the insulator upper shoulder 50 and the insulator upper end 38 and engages the insulator 26. The shell lower end 56 is disposed adjacent the insulator nose region 46 such that at least a portion of the insulator nose region 46 extends axially outwardly of the shell lower end 56.

Obviously, many modifications and variations of the present invention are possible in light of the above teachings and may be practiced otherwise than as specifically described while within the scope of the following claims.

What is claimed is:

1. An electrically conductive glass seal for a corona igniter, comprising:

at least one glass in a total amount of 50.0 to 90.0 weight (wt. %), based on the total weight of said glass seal;

electrically conductive metal particles in an amount of 10.0 to 50.0 wt. %, based on the total weight of said glass seal;

wherein the glass seal includes gas-filled pores in an amount of 25.0 to 75.0 volume percent (vol. %), based on the total volume of the glass seal; and the glass seal is electrically conductive.

2. The electrically conductive glass seal of claim 1, wherein said glass includes silica ($SiO_2$), boron oxide ($B_2O_3$), aluminum oxide ($Al_2O_3$), bismuth oxide (BOA and zinc oxide (ZnO); and said electrically conductive particles include copper.

3. The electrically conductive glass seal of claim 1, wherein said glass includes silica ($SiO_2$) in an amount of 35.0 to 40.0 wt. %, boron oxide ($B_2O_3$) in an amount of 20.0 to 28.0 wt. %, aluminum oxide ($Al_2O_3$) in an amount of 10.0 to 15.0 wt. %, bismuth oxide ($Bi_2O_3$) in an amount of 10.0 to 15.0 wt. %, and zinc oxide (ZnO) in an amount of 3.0 to 5.0 wt. %, based on the total weight of said glass.

4. The electrically conductive glass seal of claim 3, wherein said glass further include alkali metal oxides in a total amount of 2.0 to 6.0 wt. % and alkaline earth metal oxides in a total amount of 3.0 to 7.0 wt. %, based on the total weight of said glass.

5. The electrically conductive glass seal of claim 1, wherein said gas-filled pores are present in an amount of 35.0 to 45.0 vol. %, based on the total volume of said glass seal.

6. The electrically conductive glass seal of claim 1, wherein said gas-filled pores are spaced from one another by said glass and said electrically conductive metal particles.

7. The electrically conductive glass seal of claim 1, wherein said electrically conductive metal particles include copper.

8. The electrically conductive glass seal of claim 7, wherein said electrically conductive metal particles include flakes of the copper and have a particle size of less than 45 microns.

9. The electrically conductive glass seal of claim 1, wherein the glass seal has an electrically conductivity ranging from $9\times10^6$ S/m to $65\times10^6$ S/m.

10. The electrically conductive glass seal of claim 9, wherein said glass seal has an electrical conductivity above $30\times10^6$ S/m.

11. A corona igniter, comprising:

an electrically conductive component;

an insulator surrounding said electrically conductive component;

an electrically conductive glass seal providing a hermetic bond between said electrically conductive component and said insulator;

said electrically conductive glass seal including at least one glass in a total amount of 50.0 to 90.0 wt. %, and electrically conductive metal particles in an amount of 10.0 to 50.0 wt. %, based on the total weight of said glass seal;

wherein the glass seal includes gas-filled pores in an amount of 25.0 to 75.0 vol. %, based on the total volume of the glass seal; and said glass seal is electrical conductive.

12. The corona igniter of claim 11, wherein said gas-filled pores are present in an amount of 35.0 to 45.0 vol. %, based on the total volume of said glass seal and said gas-filled pores are spaced from one another by said glass and said electrically conductive metal particles.

13. The corona igniter of claim 11, wherein said glass seal has an electrically conductivity ranging from $9\times10^6$ S/m to $65\times10^6$ S/m.

14. The corona igniter of claim 11, wherein said electrically conductive component includes a central electrode surrounded by said insulator, and a firing tip at an end of said central electrode, said firing tip including a plurality of branches each extending radially outwardly from a center axis.

15. A method of manufacturing a glass seal for a corona igniter, comprising the steps of:

providing a mixture including at least one glass frit in a total amount of 48.8 to 90.0 wt. %, a binder in an amount of 0.1 to 3.0 wt. %, an expansion agent in an amount of 0.1 to 1.0 wt. %, and electrically conductive metal particles in an amount of 14.8 to 50.0 wt. %, based on the total weight of the mixture; and firing the mixture to form the glass seal, wherein the glass seal is electrically conductive.

16. The method of claim 15, wherein the expansion agent converts to a gas during the firing step and provides a plurality of pores filled with the gas, and the pores are spaced from one another by the electrically conductive particles and the glass after allowing the glass seal to cool to room temperature.

17. The method of claim 15, wherein the binder of the mixture includes an inorganic binder in an amount of 0.1 to 2.0 wt. % and an organic binder in an amount of 0.1 to 1.0 wt. %, based on the total weight of the mixture; and at least a portion of the binder burns off during the firing step.

18. A method of manufacturing a corona igniter, comprising the steps of:

disposing a mixture between an electrically conductive component and an insulator, wherein the mixture comprises at least one glass frit in a total amount of 48.8 to 90.0 wt. %, a binder in an amount of 0.1 to 3.0 wt. %, an expansion agent in an amount of 0.1 to 1.0 wt. %, and electrically conductive metal particles in an amount of 14.8 to 50.0 wt. %, based on the total weight of the mixture; and firing the mixture to form the glass seal, wherein the glass seal is electrically conductive.

19. The method of claim 18, wherein the glass seal provides a hermetic bond between the electrically conductive component and the insulator after the firing step; the expansion agent converts to a gas during the firing step and provides a plurality of pores filled with the gas, the pores are spaced from one another by the electrically conductive particles and the glass after allowing the glass seal to cool to room temperature; the binder of the mixture includes an inorganic binder in an amount of 0.1 to 2.0 wt. % and an organic binder in an amount of 0.1 to 1.0 wt. %, based on the total weight of the mixture; and at least a portion of the binder burns off during the firing step.

20. The method of claim 18 including disposing the insulator around the electrically conductive component; wherein the electrically conductive component includes a central electrode surrounded by the insulator and a firing tip located at an end of the central electrode, the firing tip including a plurality of branches each extending radially outwardly from a center axis.

21. An electrically conductive glass seal for a corona igniter, comprising:

at least one glass in a total amount of 72.0 to 82.0 weight (wt. %), based on the total weight of said glass seal;

electrically conductive metal particles in an amount of 10.0 to 25.0 wt. %, based on the total weight of said glass seal;

wherein said glass seal includes gas-filled pores in an amount of 25.0 to 75.0 volume percent (vol. %), based on the total volume of said glass seal; and said glass seal is electrical conductive.

22. The electrically conductive glass seal of claim 21, wherein said electrically conductive metal particles include flakes of copper.

23. The electrically conductive glass seal of claim 21, wherein said glass includes silica ($SiO_2$) in an amount of 60.0 to 70.0 wt. %, boron oxide ($B_2O_3$) in an amount of 17.0 to 25.0 wt. %, aluminum oxide ($Al_2O_3$) in an amount of 4.0 to 10.0 wt. %, alkali metal oxides in an amount of 3.0 to 10.0 wt. %, and alkaline earth metal oxides in an amount of 0.0 to 5.0 wt. %, based on the total weight of said glass.

24. A corona igniter, comprising:

an electrically conductive component;

an insulator surrounding said electrically conductive component;

an electrically conductive glass seal providing a hermetic bond between said electrically conductive component and said insulator;

said electrically conductive glass seal including at least one glass in a total amount of 72.0 to 82.0 wt. %, and electrically conductive metal particles in an amount of 10.0 to 25.0 wt. %, based on the total weight of the glass seal;

wherein the glass seal includes gas-filled pores in an amount of 25.0 to 75.0 vol. %, based on the total volume of the glass seal; and the glass seal is electrical conductive.

25. A method of manufacturing a glass seal for a corona igniter, comprising the steps of:

providing a mixture including at least one glass frit in a total amount of 72.0 to 90.0 wt. %, an inorganic binder in an amount of 1.0 to 5.0 wt. %, an expansion agent in an amount of 0.1 to 0.5 wt. %, and electrically conductive metal particles in an amount of 10.0 to 25.0 wt. %, based on the total weight of the mixture; and firing the mixture to form the glass seal, wherein the glass seal is electrically conductive.

26. The method of claim 25, wherein the inorganic binder includes bentonite, the expansion agent includes calcium carbonate, and the electrically conductive metal particles include flakes of copper.

27. A method of manufacturing a corona igniter, comprising the steps of:

disposing a mixture between an electrically conductive component and an insulator, wherein the mixture comprises at least one glass frit in a total amount of 72.0 to 90.0 wt. %, an inorganic binder in an amount of 1.0 to 5.0 wt. %, an expansion agent in an amount of 0.1 to 0.5 wt. %, and electrically conductive metal particles in an amount of 10.0 to 25.0 wt. %, based on the total weight of the mixture; and firing the mixture to form the glass seal, wherein the glass seal is electrically conductive.

* * * * *